(12) United States Patent
Alvarez et al.

(10) Patent No.: US 8,592,014 B2
(45) Date of Patent: Nov. 26, 2013

(54) TRI-LAYER FOOD CONTAINER

(75) Inventors: Benito Alvarez, Puebla (MX); Efrén de Urquijo Carmona, Puebla (MX)

(73) Assignee: Grupo Convermex, S.A. de C.V., Puebla, Pue. (MX)

(*) Notice: Subject to any disclaimer, the term of this patent is extended or adjusted under 35 U.S.C. 154(b) by 876 days.

(21) Appl. No.: 11/702,120

(22) Filed: Feb. 5, 2007

(65) Prior Publication Data
US 2008/0187694 A1 Aug. 7, 2008

(51) Int. Cl.
*B29D 22/00* (2006.01)

(52) U.S. Cl.
USPC ...................................................... 428/34.3

(58) Field of Classification Search
USPC ...................................................... 428/34.3
See application file for complete search history.

(56) References Cited

U.S. PATENT DOCUMENTS

| | | | |
|---|---|---|---|
| 3,759,437 A * | 9/1973 | Amberg | 229/400 |
| 3,984,511 A | 10/1976 | Lammers | |
| 4,288,026 A * | 9/1981 | Wilhelm | 229/400 |
| 4,943,459 A | 7/1990 | Nedzu | |
| 5,079,057 A | 1/1992 | Heider | |
| 5,490,631 A | 2/1996 | Iioka et al. | |
| 5,628,453 A | 5/1997 | MacLaughlin | |
| 5,759,624 A | 6/1998 | Neale et al. | |
| 5,766,709 A | 6/1998 | Geddes et al. | |
| 5,840,139 A | 11/1998 | Geddes et al. | |
| 5,908,590 A | 6/1999 | Yoshimi et al. | |
| 6,308,883 B1 | 10/2001 | Schmelzer et al. | |
| 6,703,090 B2 | 3/2004 | Breining et al. | |
| 6,749,913 B2 | 6/2004 | Watanabe et al. | |
| 6,811,843 B2 | 11/2004 | DeBraal et al. | |
| 6,908,651 B2 | 6/2005 | Watanabe et al. | |
| 2002/0182347 A1* | 12/2002 | DeBraal et al. | 428/34.2 |
| 2005/0003122 A1 | 1/2005 | Debraal et al. | |
| 2006/0005917 A1 | 1/2006 | Alvarez | |

* cited by examiner

*Primary Examiner* — James Yager
(74) *Attorney, Agent, or Firm* — Foley & Lardner LLP

(57) ABSTRACT

A container for holding food or beverages includes an inner thermoformed sleeve and a molded insulating foam support layer. The inner sleeve and foam support layer each have a circumferential wall extending from a bottom wall. The foam layer is bonded to the thermoformed sleeve on the outside or inside of the sleeve. The container can also include an outer sleeve bonded to an outer surface of the foam support layer. The inner sleeve may be made of thermoformed polystyrene. The outer sleeve may be a paper label.

21 Claims, 7 Drawing Sheets

TRI-LAYER FOOD CONTAINER

FIELD OF THE INVENTION

The present invention relates generally to a method for producing plastic foam containers with three layers. The invention further relates to a plastic foam container made of three layers, such as a cup for beverages or food items.

BACKGROUND

It is known to use plastic foam containers to hold food, drinks, or other substances. Conventional foam containers are generally inexpensive and have insulating properties. Conventional beverage containers may also be made of plastics.

Typical containers can leak substances, such as food or liquids, contained within. In some conventional containers, the substance may react with the container, causing the container to break down and leak the substance.

Furthermore, companies wish to advertise their product on the outer surface of the container. However, conventional foams or expanded polystyrene (EPS) containers do not receive and/or retain printed media clearly or effectively. The printed media may not adhere well to the outer surface or may not attach at all.

Some conventional containers have attempted to manufacture a foam cup with a plastic layer or film as a label. The plastic film may improve printability, but requires additional materials and amounts of materials, which can increase the cost associated with the materials as well as manufacturing time. Traditional labeling devices suffer from certain limitations. For example, it is often complicated to apply labels to foam containers with conical surfaces, such as cups. It is particularly difficult to cover substantially the entire outer surface of such a container, such as the entire outer wall of a cup.

An example of a conventional container is disclosed in U.S. Pat. No. 6,811,843 ("the '843 patent"). In the '843 patent, a seam is formed in the plastic layers forming the container. Another example of a conventional container is disclosed in U.S. Pat. No. 4,943,459 ("the '459 patent"). In the '459 patent, only a foamed plastic is used that is formed by a sheet. Such a method is known to be difficult to form a container that is drawable and, further, the plastic container formed by the '459 patent would have a seam.

It is therefore desirable to provide a container and a method of making the container that has good insulating properties, uses less expensive materials and is capable of having a printable surface across the entire outer surface of the container.

SUMMARY

According to an embodiment of the invention, a container is provided. The container comprises an innermost thermoformed plastic sleeve with a circumferential sidewall extending from a bottom wall. The innermost sleeve provides barrier resistance from material placed within the container. The thermoformed plastic sleeve is seamless. The container also comprises an insulating molded foam support layer with a circumferential sidewall extending from a bottom wall. The foam layer is bonded to the inner thermoformed sleeve. The foam support layer provides thermal resistance from material placed within the container. The foam support layer is also seamless. The container further comprises an outermost paper sleeve bonded to an outer surface of the foam support layer. The innermost sleeve has a higher density than the foam support layer.

Another embodiment of the invention provides a food container. The food container comprises a cup-shaped innermost thermoformed plastic sleeve with a circumferential sidewall extending from a bottom wall. The sleeve is seamless. The food container also comprises a cup-shaped molded plastic support layer that is seamless, and an outermost paper sleeve layer bonded to an outer surface of the support layer. The support layer includes a circumferential sidewall extending from a bottom wall with an inner diameter larger than an outer diameter of the inner sleeve such that the innermost sleeve is bonded to an inside surface of the support layer. The innermost sleeve has a higher density than the support layer. The innermost sleeve comprises the same plastic material as the support layer.

According to yet another embodiment of the invention, a method of forming a container is provided. The method comprises the steps of thermoforming a plastic sleeve with a bottom wall and upwards extending circumferential sidewall such that the plastic sleeve is seamless, and forming a molded one-piece insulating, beaded foam support layer with a bottom wall and upwards extending circumferential sidewall such that the support layer is seamless. The method also comprises bonding the plastic sleeve with the foam support layer to form a seamless container, and bonding an outer paper sleeve to an outer surface of the seamless container.

According to yet another embodiment, a container is provided. The container comprises an innermost thermoformed plastic sleeve with a circumferential sidewall extending from a bottom wall and an insulating molded foam support layer with a circumferential sidewall extending from a bottom wall. The innermost sleeve provides barrier resistance from material placed within the container. The thermoformed plastic sleeve is seamless. The foam layer is bonded to the inner thermoformed sleeve. The foam support layer provides thermal resistance from material placed within the container. The foam support layer is seamless. The innermost sleeve has a higher density than the foam support layer.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 2(a) and 2(b) are cross-sectional views of a container comparing the reduced wall thickness of the container of FIG. 1 compared to a known foam container wall thickness, in which FIG. 2(a) illustrates the thickness of the container of FIG. 1 and FIG. 2(b) illustrates the wall thickness of a known foam container.

DETAILED DESCRIPTION OF THE PREFERRED EMBODIMENTS

Figure 1:
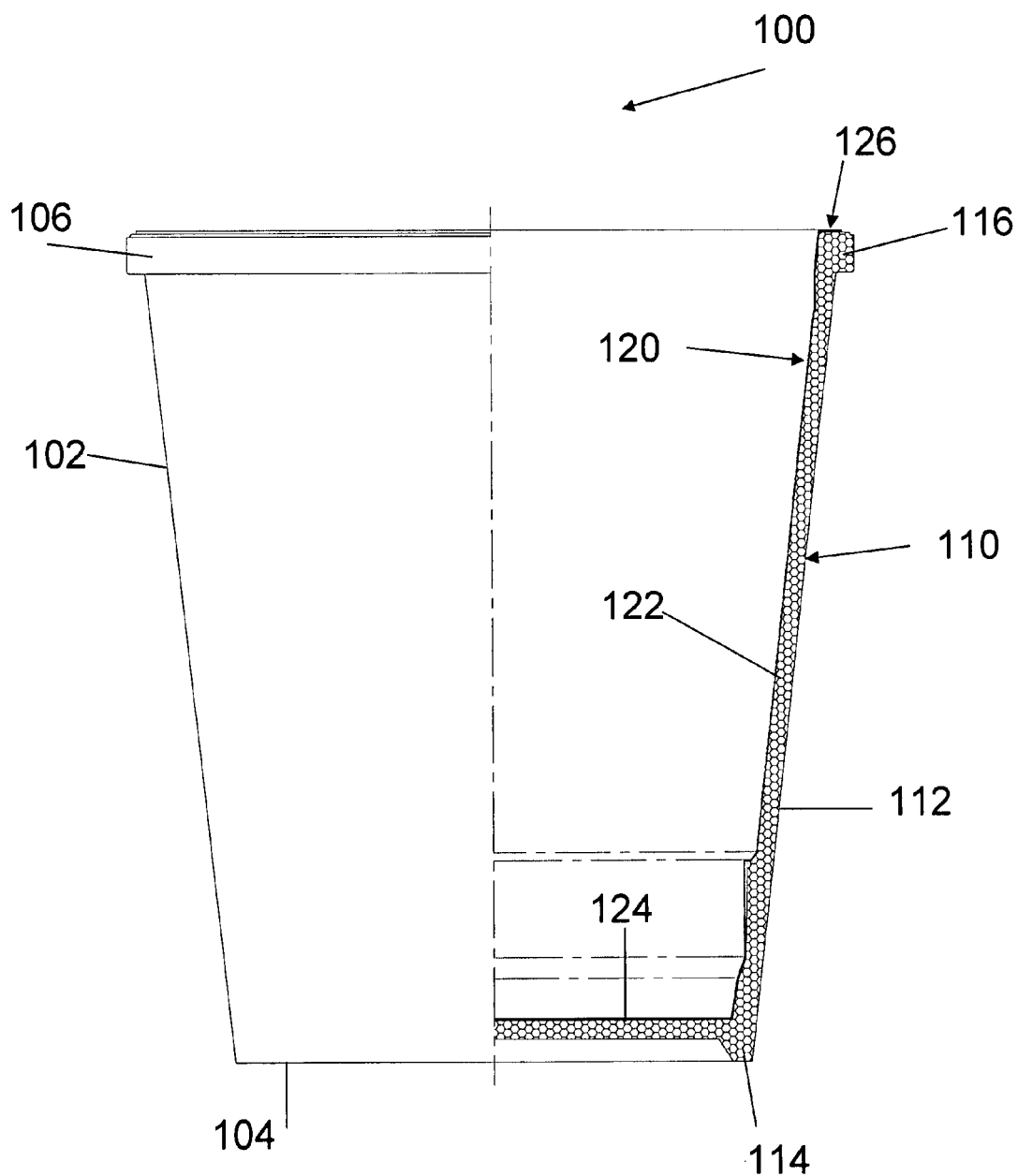
FIG. 1 is a partially cross-sectional view of a container with inner sleeve and outer support, wherein the sidewall of the container has a reduced wall thickness according to an embodiment of the invention.

FIGS. 1-4 illustrate a container 100 according to an embodiment of the invention. The container 100 may be cup-shaped and used to hold or store food and beverage or other suitable substances.

The container 100 has a sidewall 102 extending from a bottom wall 104. The container 100 also has a lip 106 (or sometimes referred to herein as a "flange") on a distal end of the sidewall 102 opposite the bottom wall 104. The container 100 is formed by a support layer 110 and an inner sleeve 120 bonded to the support layer 110. The container may also include an outer sleeve, such as described with respect to FIGS. 5-7 below.

The support layer 110 includes a circumferential sidewall 112 extending from a bottom wall 114 and a flange or lip 116. The flange 116 extends from an open end of the support layer 110 on a distal end of the sidewall 112 opposite the bottom wall 114. The support layer 110 has an inner diameter larger than an outer diameter of the inner sleeve 120 such that the inner sleeve 120 can be bonded to an inside surface of the support layer 110.

The inner sleeve 120 includes also includes a circumferential sidewall 122 extending from a bottom wall 124 and a flange or lip 126. The flange 126 extends from an open end of the inner sleeve 120 on a distal end of the sidewall 122 opposite the bottom wall 124. All or less than all of the outer surface of the inner sleeve 120, including the sidewall 122, bottom wall 124 and flange 126 is bonded to the inner surfaces of the support layer 110 to form an insulating, rigid container 100. The container 100 is preferably seamless. For example the inner sleeve 120 and/or support layer 110 are formed in such a manner that a one-piece, seamless container is created. The bonding of the inner sleeve 120 and support layer 110 creates a seamless container 100.

The inner sleeve 120 may be bonded to the support layer 110 by glue, such as with a hot mandrel. For example, the bonding of the inner sleeve 120 and support layer 110 may be accomplished by the method described in U.S. patent application Ser. No. 11/227,124 filed Oct. 1, 2004 (which is incorporated by reference herein in its entirety). Alternatively, the inner sleeve 120 and support layer 110 may be bonded together by any other suitable mechanism and/or method.

The inner sleeve 120 and support layer 110 are both made of polystyrene and, therefore, are able to bond together. The inner sleeve 120 may comprise a plastic, such as thermoformed polystyrene, expanded polystyrene (EPS), or any other suitable plastic or material. The inner sleeve 120 is preferably made of an unfoamed thermoformed polystyrene. Alternatively, the polystyrene may be foamed. The inner sleeve 120 provides barrier resistance for materials (such as liquids, food items, etc.) within the container 100. The inner sleeve 120 is the innermost sleeve of the container 100 and has a density higher than the foamed support layer 110.

The support layer 110 may comprise foam, such as a beaded foam, or any other suitable material. The foam support layer 110 may be molded or made by any other suitable method. The foam support layer 110 provides an insulating, thermal resistance from material in the container 100.

Alternatively, the inner sleeve 120 may be made of a foam and the support layer 110 may be made of thermoformed polystyrene.

Figure 2A:
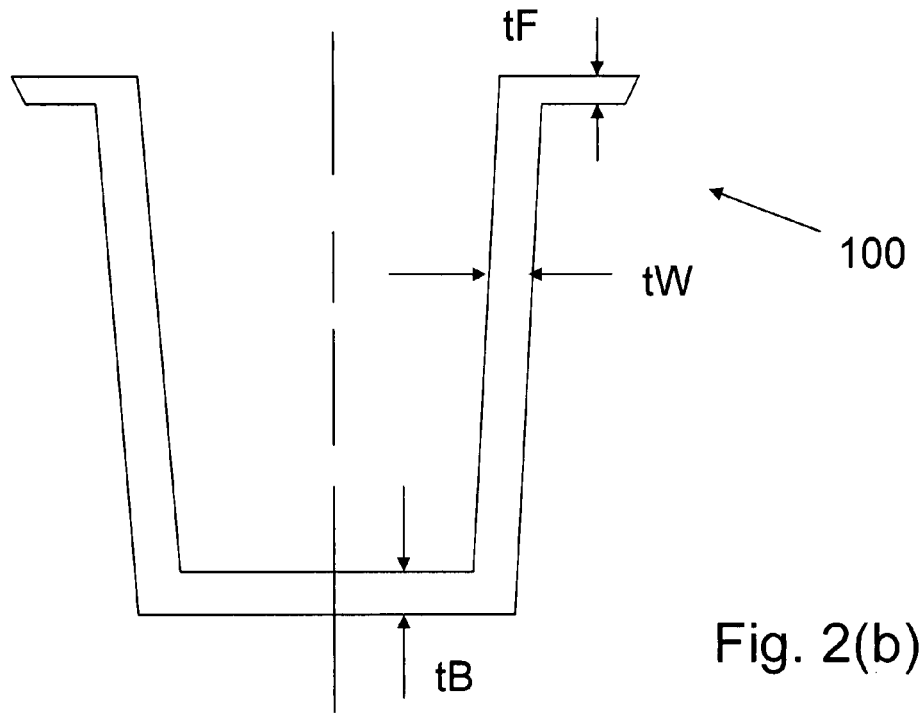
Figure 2B:
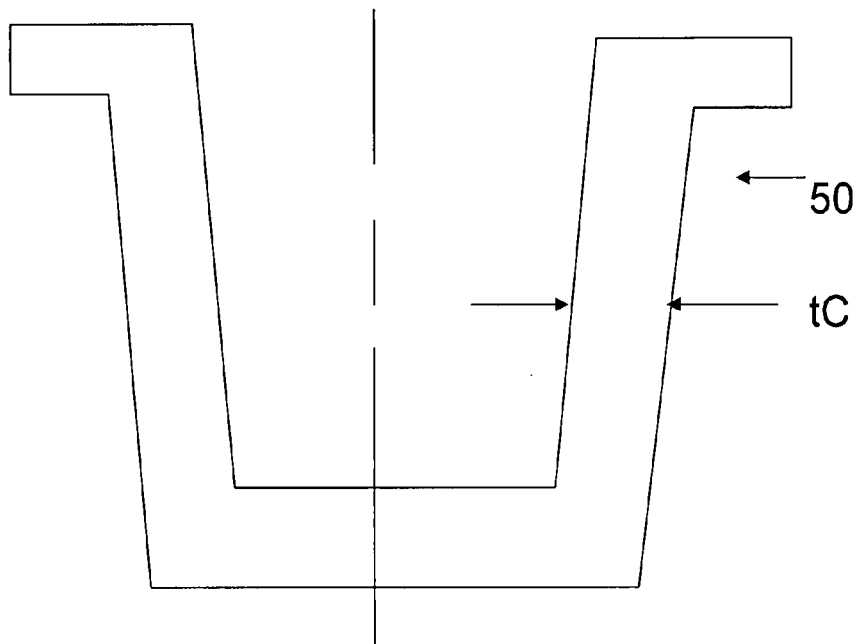

The inner sleeve 120 can reduce the thickness of the walls of the support layer 110. The rigidity of the inner sleeve 120 allows for a thinner and, thus, less expensive support layer 110 of foam. For example, a conventional foam container 50, such as shown in FIG. 2(b) must use greater amounts of foam material with thicker walls in order to provide the stability, rigidity and barrier properties for a suitable food or beverage container. FIG. 2(a) illustrates the reduced wall thicknesses according to the container 100 of the first embodiment. As shown in FIG. 2(a) the sidewall thickness tW of the container 100 is less than or equal to the sidewall thickness tC of a known container 50 (FIG. 2(b)). The total wall thickness tW of the sidewall 102 may be in the range of about 2.0 mm to 2.6 mm; or more specifically, about 2.22 mm to 2.564 mm. The total thickness tF of the flange 106 and the total thickness tB of the bottom wall 104 can vary depending upon the overall size of the container 100. The thicknesses tF and tB are determined by the thermoforming process.

Figure 3:
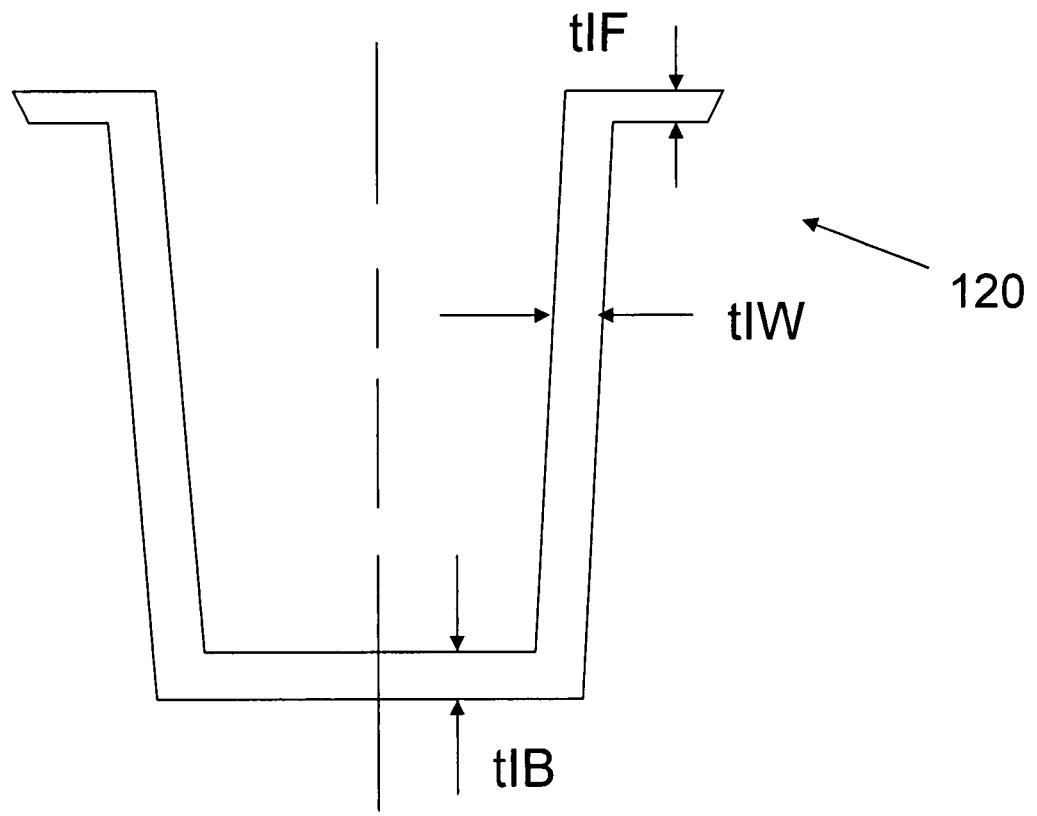
FIG. 3 is a cross-sectional view of an inner sleeve according to the container of FIG. 1 illustrating the reduced wall thickness of the inner sleeve.
Figure 4:
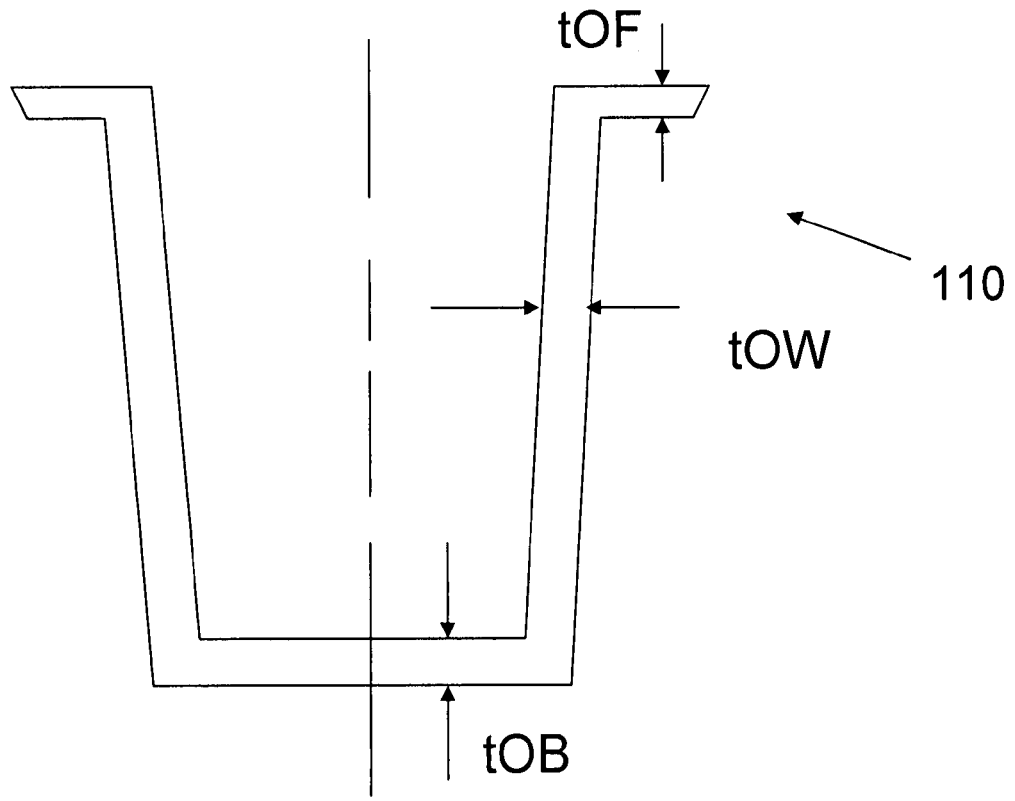
FIG. 4 is a cross-sectional view of an outer support according to the container of FIG. 1 illustrating the reduced wall thickness of the outer support.

FIG. 3 illustrates exemplary thicknesses tIF, tIW and tIB of the inner sleeve 120. In the embodiment, the inner sleeve 120 may have bottom wall 124 with a thickness tIB in a range of about 0.10 mm to 0.16 mm. More preferably, the bottom wall 124 may have a thickness tIB in a range of about 0.12 to 0.14 mm. Alternatively, the thickness tIB may be in a range of about 0.101 mm to 0.127 mm. The thickness tIB of the bottom wall 124 may be uniform (thus, have a thickness tIB of 0.12 mm or 0.14 throughout), or it may vary along the length of the bottom wall 124.

The flange 126 portion of the inner sleeve 120 may have a thickness tIF in a range of about 0.25 mm to 0.4 mm. More preferably, the flange 126 has a thickness tIF in a range of about 0.3 mm to 0.36 mm. Alternatively, the flange 126 may have a thickness tIF in a range of about 0.1 mm to 0.13 mm; or more specifically, of about 0.101 mm to 0.127 mm. The thickness tIF of the flange 126 may be uniform (thus, have a thickness tIF of 0.3 mm or 0.36 mm throughout), or it may vary along the length of the flange 126.

The thickness tIW of the sidewall 122 may have a range of about 0.05 mm to 0.15 mm. More preferably, the thickness tIW of the sidewall 122 may have a range of about 0.05 mm to 0.13 mm. Alternatively, the thickness tIW of the sidewall 122 may have a range of about 0.1 mm to 0.13 mm; or more specifically, of about 0.101 mm to 0.127 mm.

The sidewall 122 may have varying thicknesses tIW along its length. For example, near the bottom wall 124, the thickness tIW may be about 0.10 mm, with the sidewall 122 decreasing to about 0.06 mm to 0.07 mm in a middle portion of the sidewall 122, and increasing in thickness near the flange 126 to about 0.13 mm. It will be recognized that this is exemplary only. In another example, the sidewall 122 may have a thickness tIW of about 0.09 mm near the bottom wall 124, a thickness tIW of about 0.05 mm to 0.07 mm in the middle portion of the sidewall 122 and a thickness tIW of about 0.15 mm near the flange 126. Alternatively, the thickness tIW of the sidewall 122 may by uniform throughout.

In an example of the inner sleeve 120 with varying thicknesses, the diameter of the inner sleeve 120 near the flange 126 may be larger than the diameter of the inner sleeve 120 near the bottom wall 124. Furthermore, the sidewall 122 may not extend from the bottom wall 124 as a straight line, but can have a varying profile. It will be recognized that the inner sleeve 120 can have any suitable shape, configuration, profile and thickness as appropriate.

The support layer 110 may have a thickness tOW of the sidewall 112 in a range of about 2.0 mm to 2.5 mm. Alternatively, the thickness tOW may be in a range of about 2.17 mm to 2.4 mm. The thickness tOB of the bottom wall 114 may have a range of about 2.0 mm to 2.5 mm. Alternatively, the thickness tOB may be in a range of about 2.17 mm to 2.4 mm. The thickness tOF of the flange 116 may have a range of about 2.0 mm to 2.5 mm. Alternatively, the thickness tOF may be in a range of about 2.17 mm to 2.4 mm.

According to a feature of the embodiment, the amount of resin or material used to form the inner sleeve 120 that is combined with the foam material of the support layer 110 is preferably less than a standard, comparably sized and shaped foam container. This is achieved by lowering the density of the foam support layer 110 and adding a thin, rigid inner sleeve 120.

In an embodiment, the inner sleeve 120 has a weight in a range of about 2.5 grams to 3.5 grams. In an embodiment, the support layer 110 has a weight of about 4.5 grams to 5.5 grams.

In an embodiment, the container 100 has a total weight in a range of 2.0 grams to 2.7 grams. Preferably, the container 100 has a total weight of approximately 2.4 grams. Alternatively, the container 100 has a total weight in a range of 7.0 grams to 9.0 grams.

Figure 5:
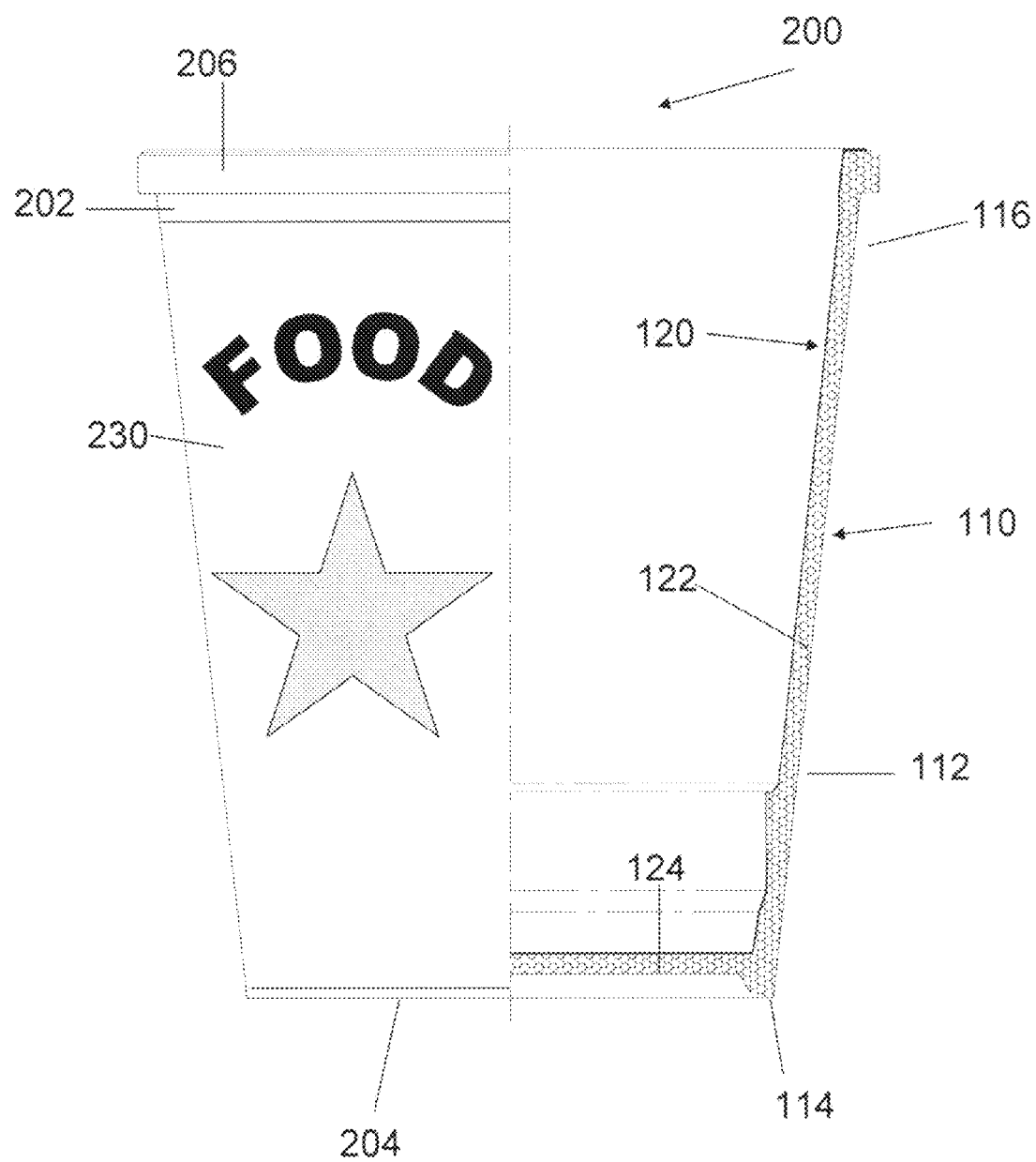
FIG. 5 is a partially cross-sectional view of a container with an inner sleeve, outer support and label layer according to another embodiment of the invention.
Figure 6:
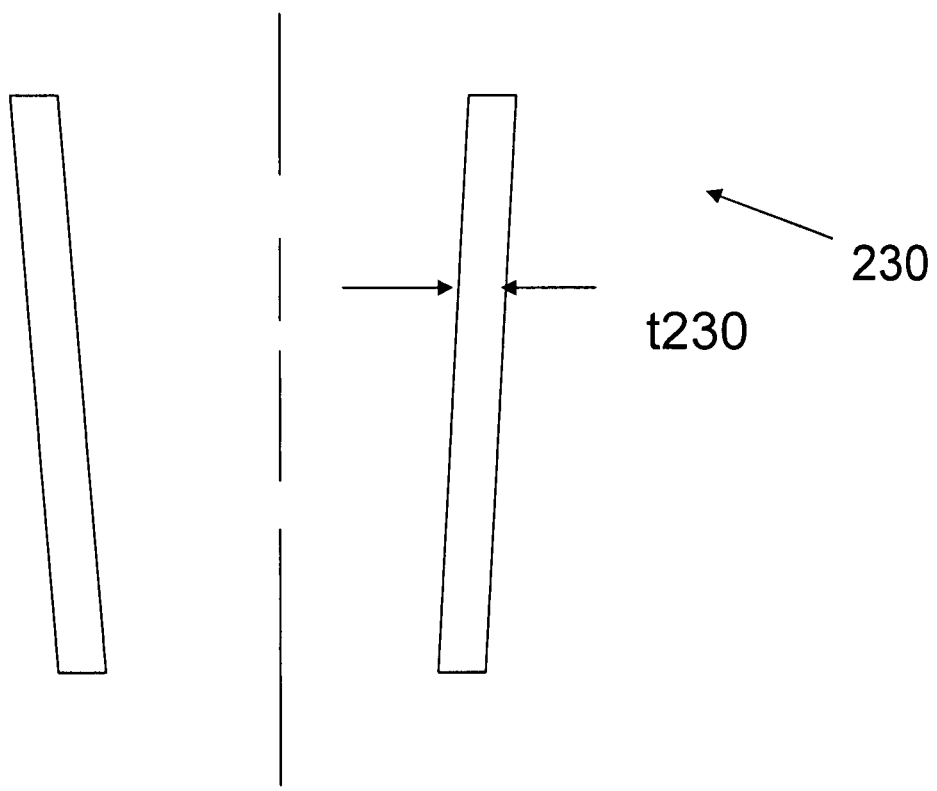
FIG. 6 is a cross-sectional view of the label layer illustrating the thickness of the layer according to the container of FIG. 5.
Figure 7:
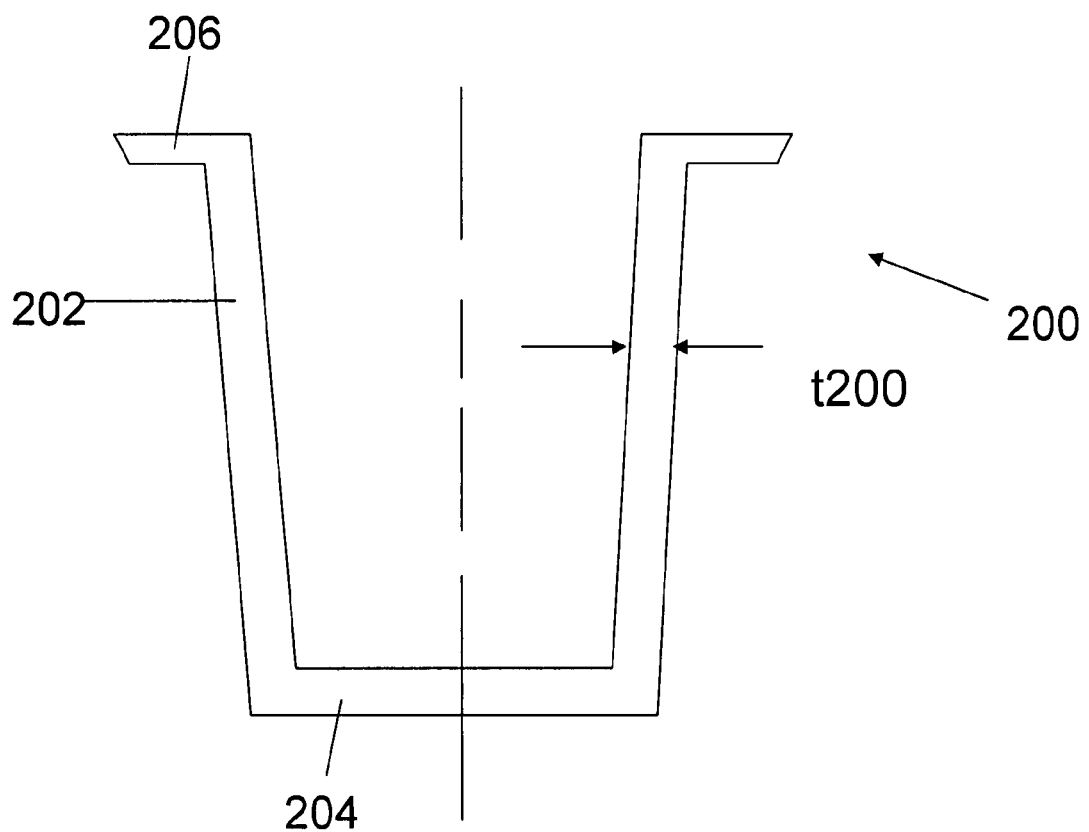
FIG. 7 is a cross-sectional view of the container illustrating the reduced wall thickness of the container of FIG. 5.

FIGS. 5-7 illustrate a second embodiment of the invention. FIG. 5 illustrates a container 200 with an insulating foam support layer 110, an inner sleeve 120 and an outer sleeve 230. As shown in FIG. 5, the container 200 includes a sidewall 202 extending from a bottom wall 204 and a lip 206. The support layer 110 and inner sleeve 120 are similar to that described above. It will be recognized that the insulating foam support layer 110 and inner sleeve 120 may be switched such that the foam support layer 110 is inside of the polystyrene sleeve 120.

The outer sleeve 230 is bonded to an outer surface of the foam support layer 110 and is preferably the outermost layer of the container 200. The outer sleeve 230 allows for a user to print a label or other matter and attach the label to the container 200. The outer sleeve 230 is made of a material, such as paper, that receives and retains printed media better than foam. The outer sleeve 230 may comprise paper, aluminum, plastic, plastic film, metallic laminations, polypropylene, polyethylene films and/or mixtures thereof. It will be recognized that any other suitable type of material may be used for the outer sleeve 230. Preferably, the outer sleeve 230 has good printing characteristics to provide improved aesthetic appearance.

The outer sleeve 230 may be bonded to the outer surface of the support layer 110 by glue, a thermal agent, a hot melt and/or a plastic coating. The plastic coating may comprise one or more of polyethylene, polypropylene, or any other suitable polymer or co-polymer or mixtures thereof. The outer sleeve 230, when bonded, may cover the entire sidewall 112, flange 116 and bottom wall 114 of the support layer 110, or just portions of the outer surfaces of the support layer 110. For example, FIG. 5 illustrates an outer sleeve 230 that covers a majority of the sidewall 112 of the support layer 110. It will be recognized that the outer sleeve 230 may have any suitable shape, size and configuration.

The outer sleeve 230 may have a suitable small thickness t230 (shown in FIG. 6) such that the thickness t200 of the container 200 is sufficiently reduced compared to a conventional container 50. For example, the thickness t230 of the outer sleeve 230 along a sidewall portion of the support layer 110 is in the range of about 0.06 mm to 0.90 mm. More specifically, the thickness t230 is in a range of about 0.068 mm to 0.90 mm. The container 200 may have a thickness t200 in the range of about 2.0 mm to 2.6 mm. More specifically, the thickness t200 of the container 200 is in a range of about 2.22 mm to 2.564 mm.

According to an embodiment, the outer sleeve 230 has a weight in a range of about 2.3 grams to 3.0 grams. In an embodiment, the total weight of the container 200 is about 9.0 grams to 12.5 grams. More specifically, the total weight of container 200 is about 9.3 grams to 12.3 grams.

It will be recognized that the thicknesses described above are exemplary, and exemplary only. The flange, bottom wall, and sidewall may have varying thicknesses depending upon the overall size of the container 100, 200, and/or the thermoforming process.

According to embodiments and features of the invention, embodiments of the invention may be used to form a two or three layer plastic cup with excellent barrier properties, reduced wall thickness, reduced materials costs and excellent aesthetic appearance, while maintaining acceptable rigidity and other characteristics.

It is an object of the invention to provide reduce the costs associated with the materials of a container. It is an other object of the invention to provide a container with good barrier properties such that no substance will leak out of the container. It is another object of the invention to reduce the wall thickness of the container.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A container comprising:
   an innermost thermoformed plastic sleeve with a circumferential sidewall extending from a bottom wall, the innermost sleeve providing barrier resistance from material placed within the container, the thermoformed plastic sleeve being seamless;
   an insulating molded foam support layer with a circumferential sidewall extending from a bottom wall, the foam layer being directly bonded to the innermost thermoformed sleeve, the foam support layer providing thermal resistance from material placed within the container, the foam support layer being seamless; and
   an outermost paper sleeve directly bonded to an outer surface of the foam support layer,
   wherein the innermost sleeve has a higher density than the foam support layer, and
   wherein the thermoformed plastic sleeve and the molded foam support layer comprise the same plastic material.

2. The container according to claim 1, wherein the outermost paper sleeve is directly bonded to at least the sidewall of the foam support layer.

3. The container according to claim 1, wherein the foam support layer comprises beaded foam.

4. A container comprising:
   an innermost thermoformed plastic sleeve with a circumferential sidewall extending from a bottom wall, the innermost sleeve providing barrier resistance from material placed within the container, the thermoformed plastic sleeve being seamless;

an insulating molded foam support layer with a circumferential sidewall extending from a bottom wall, the foam layer being directly bonded to the innermost thermoformed sleeve, the foam support layer providing thermal resistance from material placed within the container, the foam support layer being seamless; and an outermost paper sleeve directly bonded to an outer surface of the foam support layer, wherein the innermost sleeve has a higher density than the foam support layer, and wherein the innermost sleeve comprises thermoformed polystyrene.

5. The container according to claim 1, wherein the circumferential sidewall of the innermost sleeve has a thickness in a range of about 0.101 mm to 0.127 mm.

6. The container according to claim 1, wherein the circumferential sidewall of the foam layer has a thickness in a range of about 2.17 mm to 2.4 mm.

7. The container according to claim 1, wherein a thickness of the outermost sleeve is in a range of about 0.068 mm to 0.90 mm.

8. The container according to claim 1, wherein the container has a weight in a range of about 9.0 grams to 12.5 grams.

9. The container according to claim 8, wherein the container has a weight in a range of 9.3 to 12.2 grams.

10. The container according to claim 5, wherein a total thickness of the container is about 2.0 mm to 2.6 mm.

11. The container according to claim 1, wherein the container only has three layers, which comprise the thermoformed plastic sleeve, the molded foam support layer, and the paper sleeve.

12. The container according to claim 1, wherein the same plastic material is polystyrene.

13. A food container comprising:

a cup-shaped innermost thermoformed plastic sleeve with a circumferential sidewall extending from a bottom wall, the sleeve being seamless;

a cup-shaped molded plastic support layer, the support layer being seamless; and an outermost paper sleeve layer directly bonded to an outer surface of the support layer, wherein the support layer includes a circumferential sidewall extending from a bottom wall with an inner diameter larger than an outer diameter of the innermost sleeve such that the innermost sleeve is directly bonded to an inside surface of the support layer, and wherein the innermost sleeve has a higher density than the support layer, and wherein the innermost sleeve comprises the same plastic material as the support layer.

14. The food container according to claim 13, wherein the innermost sleeve comprises thermoformed polystyrene.

15. The food container according to claim 13, wherein the support layer comprises molded insulating polystyrene foam.

16. The food container according to claim 13, wherein the circumferential sidewall of the innermost sleeve has a thickness in a range of about 0.101 mm to 0.127 mm.

17. The food container according to claim 13, wherein the circumferential sidewall of the support layer has a thickness in a range of about 2.17 mm to 2.4 mm.

18. The food container according to claim 13, wherein a thickness of the outermost sleeve layer is in a range of about 0.068 mm to 0.90 mm.

19. The food container according to claim 13, wherein the food container has a weight in a range of about 9.0 to 12.5 grams.

20. The food container according to claim 19, wherein the food container has a weight in a range of about 9.3 to 12.2 grams.

21. The food container according to claim 19, wherein a total thickness of the food container is about 2.0 mm to 2.6 mm.

* * * * *